(12) United States Patent
Kubin

(10) Patent No.: US 8,870,143 B2
(45) Date of Patent: Oct. 28, 2014

(54) LOW PROFILE SECURE ASYMMETRICAL TURN-LOCK COUPLING MECHANISM WITH MAGNETIC ROTATIONAL ORIENTATION LOCKS

(71) Applicant: Dmitry Kubin, Oakland, MD (US)

(72) Inventor: Dmitry Kubin, Oakland, MD (US)

(*) Notice: Subject to any disclaimer, the term of this patent is extended or adjusted under 35 U.S.C. 154(b) by 122 days.

(21) Appl. No.: 13/772,303

(22) Filed: Feb. 20, 2013

(65) Prior Publication Data

US 2013/0221189 A1 Aug. 29, 2013

Related U.S. Application Data

(60) Provisional application No. 61/601,394, filed on Feb. 21, 2012.

(51) Int. Cl.
*A47G 1/17* (2006.01)
*F16M 13/04* (2006.01)
*F16M 11/04* (2006.01)

(52) U.S. Cl.
CPC ............. *F16M 13/04* (2013.01); *F16M 11/041* (2013.01); *Y10S 248/922* (2013.01)
USPC ................ 248/309.4; 248/222.52; 248/299.1; 248/922

(58) Field of Classification Search
CPC ............. A47G 1/17; A47K 5/05; A47K 5/02; A47K 2201/02; G09F 7/04; B60R 2011/007; B60R 11/0241; F16B 37/045; F16B 21/02; A47J 45/02; F16M 11/041; F16M 13/04
USPC ............. 248/222.11, 222.41, 222.51, 222.52, 248/289.31, 309.4, 918, 922, 299.1; 379/454
See application file for complete search history.

(56) References Cited

U.S. PATENT DOCUMENTS

| | | | | |
|---|---|---|---|---|
| 3,860,209 | A * | 1/1975 | Strecker | 410/116 |
| 6,302,617 | B1 * | 10/2001 | Rumpp | 403/348 |
| 7,228,651 | B1 * | 6/2007 | Saari | 40/1.5 |
| 7,290,683 | B2 * | 11/2007 | Gerenraich | 222/180 |
| 7,755,666 | B2 * | 7/2010 | Noji | 348/208.11 |
| 8,517,234 | B2 * | 8/2013 | Kincaid et al. | 224/198 |
| 2003/0019893 | A1 * | 1/2003 | Decoteau | 224/162 |

* cited by examiner

*Primary Examiner* — Gwendolyn W Baxter

(57) ABSTRACT

The device provides a quick release holding capability. The holder apparatus include a top plate attachment for the portable handheld-size device and a base plate mounted on a variety of surfaces via means that include but not limited to: brackets, screws, rivets, etc. Asymmetrical turn lock mechanism in conjunction with magnetic locks prevents accidental release. It also has additional feature where the portable device can be turned 360 degrees in increments of 90 degree angles activating magnetic locks in each 90 degree position.

15 Claims, 3 Drawing Sheets

LOW PROFILE SECURE ASYMMETRICAL TURN-LOCK COUPLING MECHANISM WITH MAGNETIC ROTATIONAL ORIENTATION LOCKS

CROSS REFERENCE TO RELATED APPLICATION

The present application claims the benefit under 35 U.S.C. 119(e) of the priority date of provisional application 61/601,394, filed Feb. 21, 2012.

FIELD OF THE INVENTION

The present invention relates to a mounting device for holding and operating handheld devices.

BACKGROUND OF THE INVENTION

There are many accessories in the market now to enable portable devices users to mount their mobile devices in different locations. Most popular locations are on arms, belts, and car dashboards. However, very little products enable users to wear their phones on their wrist. Virtually no popularly marketed products allow devices to be mounted and used across functions—wrist to arm to belt to car dashboards. Most products available in the market now are one function only—arm, belt, or car mount.

SUMMARY OF THE INVENTION

It is the object of this invention to provide a device for holding and operating handheld-size devices on one's wrist, arm, belt, and other surfaces and materials such as but not limited to: strap dashboard, wall, equipment, etc. It has a top platform that is attached to the base using turn lock mechanism and can be rotated 360 degrees with magnetic locks with 90 degrees incremental rotation in either direction. The base is mountable platform by the means such as but not limited to: brackets, adhesives, screws, rivets, etc. The handheld device is then secured to this top platform via adhesive pads, tripod screws or other temporary or permanent solutions. The purpose of the top platform is to allow the device to be locked in the first platform (base) and to turn and lock handheld device in desired orientation without disengaging these two plates.

It is also the object of this invention to specifically, provide unobstructed access to portable device and its input/output mechanisms.

It is yet another object of this invention is to provide functional orientation adjustment via rotation of handheld device facilitating magnetic locks in four basic orientations.

It is yet another object of this invention is to provide secure connection of two plates using combination of asymmetrical (locking lug on top plate oriented ant 45 degrees to its orientation and cut on base plate oriented to 90 degrees to its orientation) turn lock and magnetic lock mechanisms.

It is yet another object of this invention is to provide easy engage/disengage function for portable handheld-size devices.

It is yet another object of this invention is to provide compatibility with variety of portable handheld-size devices such as but not limited to: smartphone, GPS, media player, video camera, high-powered laser pointer, etc., and mounting options on variety of materials and surfaces such us but not limited to: wristband, armband, belt, strap, webbing, car dashboard, wall, table, equipment, etc.

BRIEF DESCRIPTION OF THE DRAWINGS

The drawing constitutes a part of this specification and includes an exemplary embodiment to the invention, which may be embodied in various forms.

DETAILED DESCRIPTION OF THE HANDHELD DEVICE HOLDER

Detailed description of the preferred embodiment is provided herein. It is to be understood, however, that the present invention may be embodied in various forms. Therefore, specific disclosed details are not to be interpreted as limiting but rather as a basis for the claim and as a representative basis for teaching one skilled in the art to employ the present invention in virtually any appropriately detailed system, structure or manner.

Figure 1:
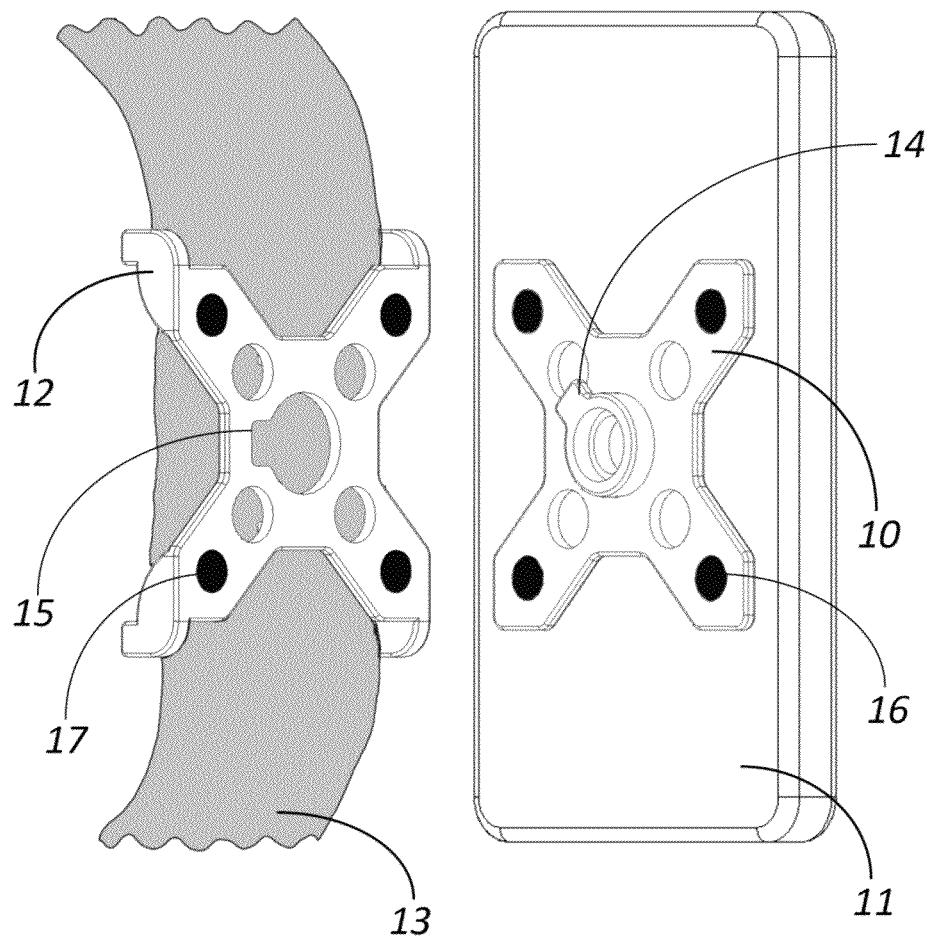
FIG. 1 is a perspective view of the top plate 10 attached to a handheld device (i.e., smartphone) 11 and base plate 12 secured to the strap 13.

FIG. 1 is illustrating a handheld device 11 secured (via adhesives, screws or other temporary or permanent means of attachment) to the top plate 10 and the base 12 mounted on a strap or webbing 13 via brackets (pictured) or other means applicable. Picture also demonstrates turn lock locking lug 14 on top plate 10 and turn lock cut 15 on base plate 12.

Figure 2:
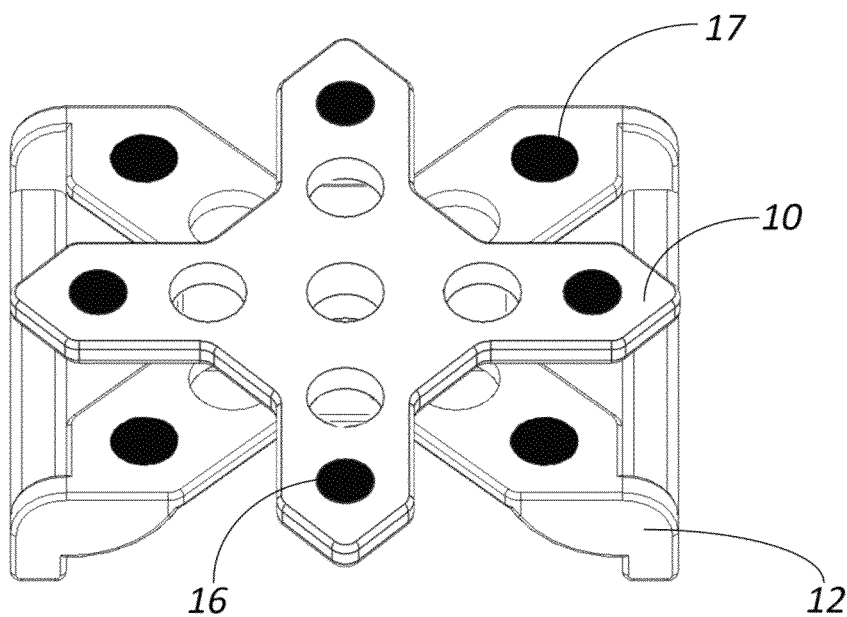
FIG. 2 shows top and base plates together in a release position via aligning locking lug on top plate 14 and cut on base plate 12. Magnetic locks disengaged due to misalignment of magnetic pairs.

FIG. 2 illustrates insert/release in a half-lock orientation of top and base plates. Locking lug 14 on top plate 10 which is oriented 45 degrees to the device orientation is plugged into cut 15 on base plate 12 which is oriented 90 degrees to device orientation. Therefore device will be locked on 3 out of 4 half-lock orientations thus providing security during operational change of full-lock orientations. 1 out of 4 half-lock orientations will serve as an insert/release position.

Figure 3:
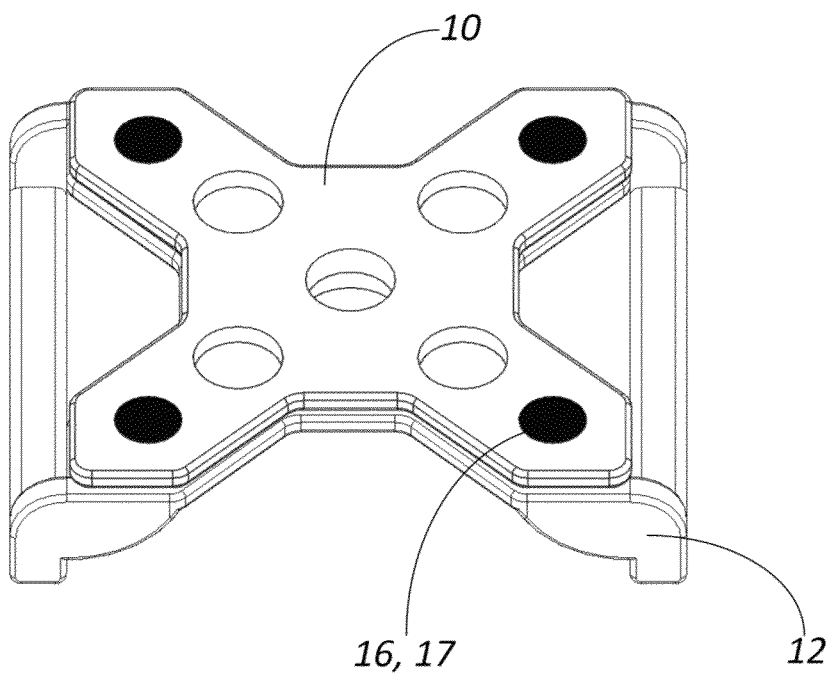
FIG. 3 demonstrate locked position of top and base plates by aligning/engaging pairs of magnets 16, 17 and engaging central turn lock mechanism by misaligning locking lug 14 on top and cut 15 on base plates.

FIG. 3 illustrates full-lock orientation of top and base plates thus aligning top plate magnets 16 with base plate magnets 17. Central turn lock prevents accidental release by misaligning locking lug on top plate 10 and cut on base plate 10. Central turn lock is engaged in all operational orientation of the device thus providing added security.

Figure 4:
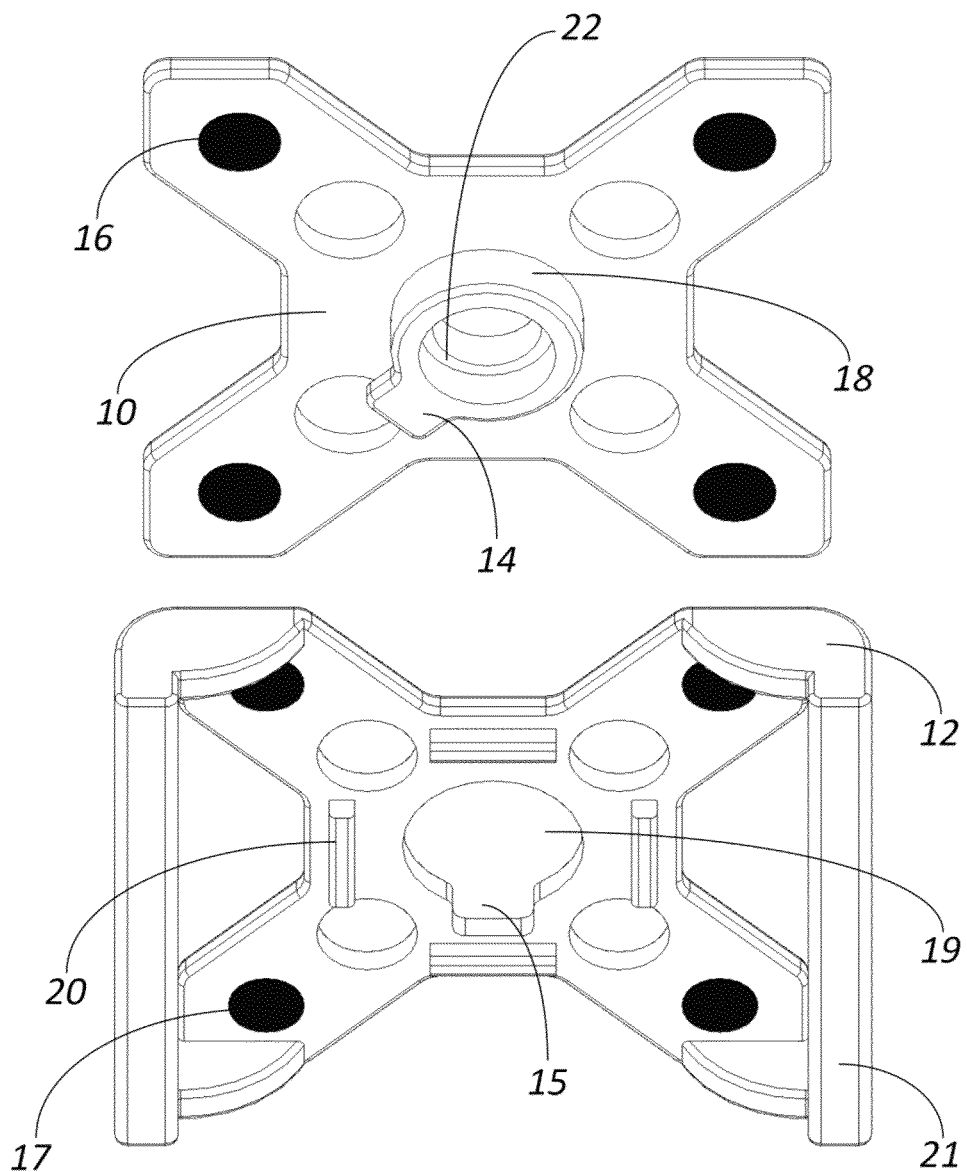
FIG. 4 is an exploded view of the components of the wristband handheld device holder.

FIG. 4. illustrates the exploded components of the invention. The top part of the device 10 is consisting of plate with magnets 16 inserted in each four corners. Component 18 provides the axis for the rotation of platform 10 while locking lug 14 prevents disengagements of plates during operation and oriented 45 degrees to the shape of the plate. Base plate, viewed from below, is same general shape as top plate and has same number of magnets placed symmetrically and respectively as ones on the top plate oriented to attract paired magnets from top plate. Base plate 12 feature central round insert opening 19 with turn lock cut 15 to be used for coupling and releasing top and base plates. Component 20 provides clearance for the component 18 and the locking lug 14 to ensure unobstructed functionality. Brackets 21 or other means of mounting are used to hold the base plate on the strap, webbing, or other surfaces. Transitional opening in the component provides option of using screw to mount devices to the top plate with screw interface such as portable cameras, lasers, etc.

The device is ergonomically designed to have a low profile, and is sufficiently thin to accommodate various handheld devices for practical applications without being bulky or cumbersome. This device facilitates rotation, while providing secure turn lock mechanism preventing accidental release.

While the invention is susceptible of embodiments in many forms, these specifications and the accompanying drawings disclose only some specific forms as examples of the invention. This invention is not indented to be limited to the embodiment so described; however, the scope of the invention is pointed out in the appended claim.

The invention claimed is:

1. A portable device holder which allows operation of a handheld-size device attached thereto comprising: an incrementally rotatable platform attachable to the device, a base which releasably attaches to the platform with an asymmetrical turn lock mechanism that provides a range of rotation of the platform with respect to the base, and pairs of magnets located one of each pair on the platform and an other of each pair on the base, said magnets exhibiting a magnetic force that provides a plurality of user-selectable positions each corresponding to a respective increment of rotation of the platform with respect to the base.

2. The device holder of claim 1, wherein the range of rotation is a full rotation of 360 degrees.

3. The device holder of claim 1, wherein the increment of rotation is 90 degrees, and the number of pairs of magnets is 4.

4. The device holder of claim 1, wherein the turn lock mechanism prevents release of the platform from the base at each user-selectable position.

5. The device holder of claim 4, wherein the turn lock mechanism provides for release of the platform from the base only at one or more release positions which do not correspond to any of the plurality of user-selectable positions.

6. The device holder of claim 5, wherein the release positions correspond to a position that is equidistant between two adjacent user-selectable positions.

7. The device holder of claim 6, wherein there is only one release position.

8. The device holder of claim 5, wherein the one or more release positions are secured by a user-activated lock mechanism.

9. The device holder of claim 1, wherein the base further comprises a mounting mechanism that allows attachment to a mountable surface.

10. The device holder of claim 9, wherein the mounting mechanism further comprises one or more of a flexible strap, webbing, or a wristband.

11. The device holder of claim 9, wherein the mounting mechanism further comprises a means to mount the base to a hard surface.

12. The device holder of claim 1, wherein the handheld-size device is one of a smartphone, GPS device, or media player.

13. The device holder of claim 1, wherein the handheld-size device is one of a camera or portable recording equipment.

14. The device holder of claim 1 wherein the handheld-size device is a camera and it is attached to the platform with a screw.

15. A portable device holder which allows operation of a handheld-size device attached thereto comprising: an incrementally rotatable platform attachable to the device, a base which attaches to the platform with an asymmetrical turn lock mechanism that provides a range of rotation of the platform with respect to the base, and pairs of magnets located one of each pair on the platform and an other of each pair on the base, said magnets exhibiting a magnetic force that provides a plurality of user-selectable positions each corresponding to a respective increment of rotation of the platform with respect to the base.

* * * * *